UNITED STATES PATENT OFFICE.

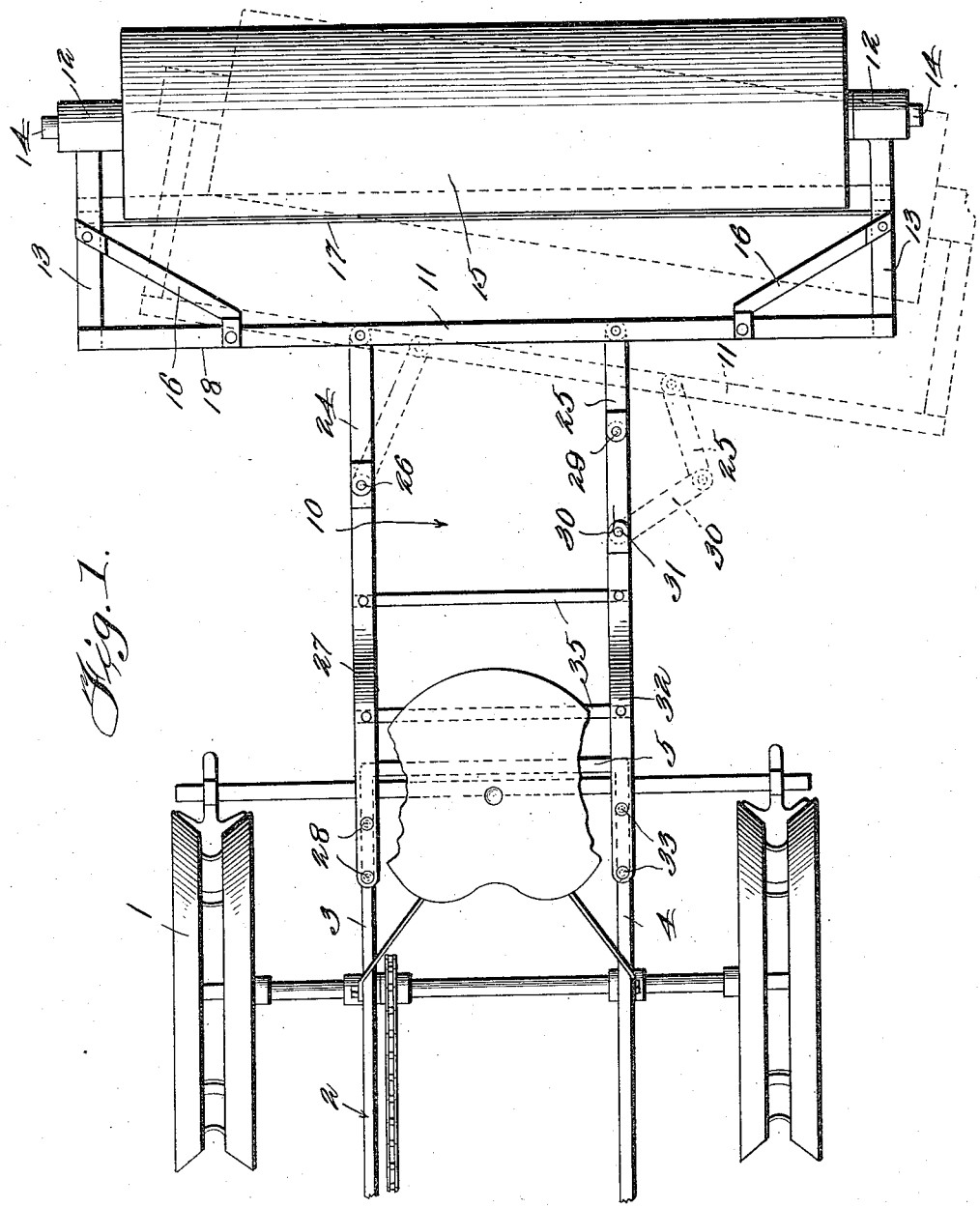

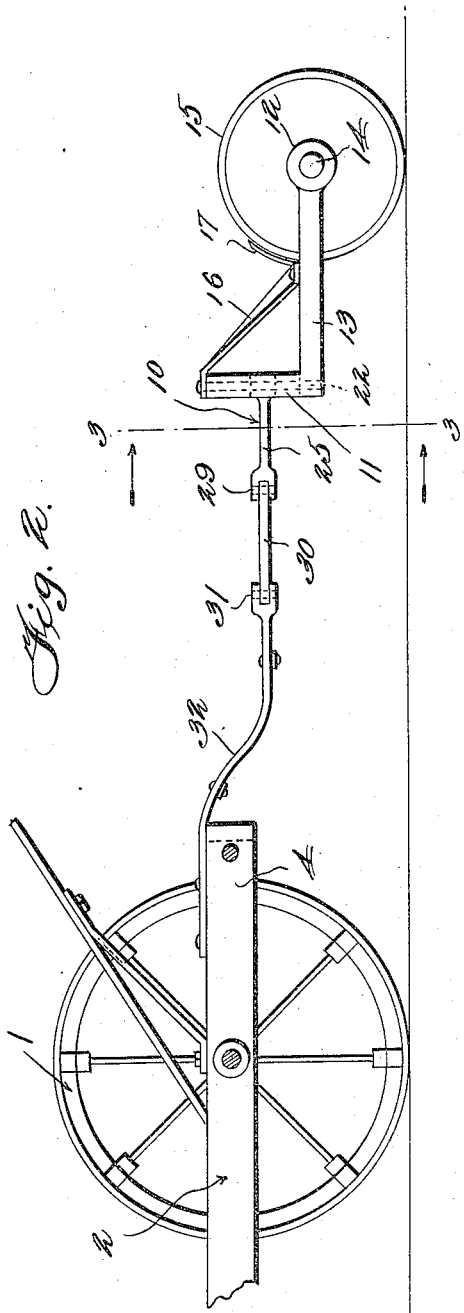

JOHN DRAPELA, OF TAITON, TEXAS.

ROLLER ATTACHMENT FOR CORN AND COTTON PLANTERS.

1,168,180.  Specification of Letters Patent.  Patented Jan. 11, 1916.

Application filed June 19, 1915. Serial No. 35,112.

*To all whom it may concern:*

Be it known that I, JOHN DRAPELA, a citizen of the United States, residing at Taiton, in the county of Wharton and State of Texas, have invented certain new and useful Improvements in Roller Attachments for Corn and Cotton Planters; and I do hereby declare the following to be a full, clear, and exact description of the invention, such as will enable others skilled in the art to which it appertains to make and use the same.

This invention relates to land rollers, and the primary object of the invention is to provide a land roller and a novel form of connecting and supporting mechanism for attaching a roller to a planter, rearwardly of the same, for rolling the ground after the seeds have been deposited therein.

Another object of this invention is to provide a novel form of connecting bridges for attaching the roller to the corn planter structure, for permitting the roller to move angularly, when the planter turns a corner or turns about at the end of a row, eliminating the usual flying to one side of the roller, which is occasioned when it is attached by means of stiff or rigid braces to the planter.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved roller, Fig. 2 is a side elevation of the roller, and Fig. 3 is a sectional view on the line 3—3 of Fig. 2.

Referring more particularly to the drawings, 1 designates a planter construction of any ordinary type used for planting corn, or like agricultural products. The corn planter 1 has the usual type of supporting frame 2, which is substantially rectangular in shape, including side rails 3 and 4, and a rear cross rail 5.

The roller structure, designated by the numeral 10 as an entirety, includes a substantially U-shaped frame 11, which has bearings 12 formed upon the ends of its legs 13. The bearings 12 have the spindles 14 of a roller 15 rotatably mounted therein. The roller 15 is of any desired construction, and long enough to roll the soil or dirt over each row of grain dropped by the planter 1, as is clearly shown in Fig. 1 of the drawings.

The legs 13 of the U-shaped frame 11 are braced by bracing rods 16 which extend across the corners of the same. A scraper blade 17 is secured to the under surfaces of the legs 13, intermediate their ends, and it is positioned for preventing the accumulation of dirt on the surface of the roller 15. The forward end, or the cross bar 18 of the U-shaped frame 11, is raised above the legs 13, as is clearly shown in Fig. 2 of the drawings, and it is composed of a substantially rectangular frame, indicated at 19 in Fig. 3 of the drawings. The top and bottom bars 20 and 21 of the frame 19, have vertical pins 22 carried thereby, to which are pivotally connected bars 24 and 25.

The bar 24 is pivotally connected at 26, to a bar 27. The bar 27 extends forwardly from the structure 11, and is connected to the guide 3 of the supporting frame 2 of the corn planter 1, by bolts or analogous fastening devices 28.

The bar 25 is pivotally connected at 29, to a link or bar 30, which bar is in turn pivotally connected at 31 to a bar 32. The bar 32 extends forwardly and is connected to the side rail 4 of the supporting structure 2 by means of bolts or analogous fastening devices indicated at 33. The pivotal connection between the bars 25, 30 and 32 form a hinged joint, which permits of the shortening of the side of the attaching structure formed by the bars, when the planter and roller turn a corner, as is shown in dotted lines in Fig. 1 of the drawings.

The bars 27 and 32 are connected and braced by cross braces 35. The bars 27 and 32 are bent or curved upwardly intermediate of their ends, as is clearly shown in Fig. 2 of the drawings, for having their forward ends positioned properly for engagement with and resting upon the upper surfaces of the side rails 3 and 4 of the supporting frame 2, and for dropping the roller downwardly, so that it will roll over the surface of the ground without straining the bars.

From the foregoing description taken in connection with the accompanying drawings the advantages of construction and of the method of operation of the improved roller attachment for planters will be readily apparent to those skilled in the art to which this invention appertains and, while in the foregoing description, the principle of the operation of this invention has been described, together with various features of construction, combination and arrangement of parts may be altered to suit practical conditions provided such alterations are comprehended within the scope of what is claimed.

What is claimed is:—

The combination with a planter of ordinary construction; of a roller, a frame connected to said roller for rotatably supporting the same, a bar pivotally connected to said frame, a second bar pivotally connected to said first named bar and detachably connected to the planter frame, a bar detachably connected to said planter frame in spaced relation with respect to said second named bar, and a pair of bars pivotally connected to each other and to said last named bar and roller frame.

In testimony whereof I affix my signature in presence of two witnesses.

JOHN DRAPELA.

Witnesses:
R. J. NAISER,
J. W. VALIGURA.

Copies of this patent may be obtained for five cents each, by addressing the "Commissioner of Patents, Washington, D. C."